US010447101B2

(12) United States Patent
Bott et al.

(10) Patent No.: US 10,447,101 B2
(45) Date of Patent: Oct. 15, 2019

(54) PERMANENT MAGNET ROTOR WITH SICKLE-SHAPED ENVELOPE FOR POLAR PERMANENT MAGNET RUNNING ARCUATELY ALONG THE ROTOR BOUNDARY

(71) Applicant: Siemens Aktiengesellschaft, München (DE)

(72) Inventors: Erich Bott, Hollstadt (DE); Reiner Seufert, Salz (DE); Rolf Vollmer, Gersfeld (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

(21) Appl. No.: 16/060,318

(22) PCT Filed: Nov. 7, 2016

(86) PCT No.: PCT/EP2016/076840
§ 371 (c)(1),
(2) Date: Jun. 7, 2018

(87) PCT Pub. No.: WO2017/097511
PCT Pub. Date: Jun. 15, 2017

(65) Prior Publication Data
US 2019/0027984 A1  Jan. 24, 2019

(30) Foreign Application Priority Data

Dec. 11, 2015  (EP) .................................... 15199587

(51) Int. Cl.
*H02K 1/27* (2006.01)
*H02K 21/22* (2006.01)
*H02K 7/18* (2006.01)

(52) U.S. Cl.
CPC ........... *H02K 1/2786* (2013.01); *H02K 21/22* (2013.01); *H02K 7/183* (2013.01); *H02K 7/1838* (2013.01); *H02K 7/1846* (2013.01); *Y02E 10/725* (2013.01)

(58) Field of Classification Search
CPC ........ H02K 1/278; H02K 1/27; H02K 1/2786; H02K 1/2753; H02K 1/274; H02K 21/22;
(Continued)

(56) References Cited

U.S. PATENT DOCUMENTS 5,170,085 A * 12/1992 Shinto .................... H02K 1/278
310/156.28
5,939,809 A * 8/1999 Mobius .................. H02K 1/278
310/156.13
(Continued)

FOREIGN PATENT DOCUMENTS

CN  102629812 A  8/2012
CN  104158325 A  11/2014
(Continued)

OTHER PUBLICATIONS

Bott et al, U.S. Pat. No. 8,922,072, Dec. 30, 2014, 2012/0146435, Jun. 14, 2012.
(Continued)

*Primary Examiner* — Julio C. Gonzalez
*Assistant Examiner* — Maged M Almawri
(74) *Attorney, Agent, or Firm* — Henry M. Feiereisen LLC

(57) ABSTRACT

A permanent magnet for connecting with a connection device of an external rotor machine includes a north pole and a south pole as magnetic poles. A magnetic field runs from the south pole to the north pole, with a cross section of the permanent magnet having an envelope with a concave section. The envelope has, in the form of a sickle, the
(Continued)

concave section and a convex section. The permanent magnet runs in an arcuate manner along the convex section, and the magnetic poles run in an arcuate manner along the concave section.

14 Claims, 9 Drawing Sheets

(58) Field of Classification Search
CPC .... H02K 21/222; H02K 7/183; H02K 7/1838; H02K 7/1846; Y02E 10/725; Y02E 10/721
USPC ............ 310/156.08, 156.15, 156.28, 156.29, 310/156.38, 156.43, 156.45, 154.13, 310/156.01, 156.03, 156.12, 156.21, 310/156.22, 156.23, 156.31, 156.42, 310/156.55, 156.68
See application file for complete search history.

(56) References Cited

U.S. PATENT DOCUMENTS

| | | | |
|---|---|---|---|
| 6,492,755 B1 * | 12/2002 | Jones | H02K 1/278 310/156.12 |
| 6,750,580 B2 * | 6/2004 | Lai | H02K 1/278 310/156.28 |
| 7,501,728 B2 | 3/2009 | Seufert et al. | |
| 7,692,356 B2 | 4/2010 | Bott et al. | |
| 10,102,953 B2 * | 10/2018 | Powell | H01F 7/0221 |
| 2003/0011267 A1 | 1/2003 | Vollmer | |
| 2004/0150281 A1 * | 8/2004 | Malmberg | H01F 7/0221 310/156.28 |
| 2007/0114861 A1 | 5/2007 | Bott et al. | |
| 2008/0169718 A1 | 7/2008 | Bott et al. | |
| 2009/0160283 A1 | 6/2009 | Bott et al. | |
| 2009/0251013 A1 | 10/2009 | Bott et al. | |
| 2010/0319442 A1 | 12/2010 | Bott | |
| 2012/0019088 A1 * | 1/2012 | Stiesdal | H02K 1/28 310/156.12 |
| 2012/0194024 A1 * | 8/2012 | Okada | H02K 1/278 310/156.01 |
| 2013/0200735 A1 * | 8/2013 | Lynch | H02K 1/28 310/59 |
| 2014/0021819 A1 | 1/2014 | Hong et al. | |
| 2015/0233421 A1 | 8/2015 | Bott et al. | |
| 2016/0065014 A1 | 3/2016 | Bott et al. | |
| 2016/0065016 A1 * | 3/2016 | Seufert | H02K 1/16 310/156.08 |
| 2016/0141931 A1 * | 5/2016 | Kawai | H02K 1/30 310/156.12 |

FOREIGN PATENT DOCUMENTS

| | | |
|---|---|---|
| EP | 1276212 A2 | 1/2003 |
| EP | 14183004.2 | 9/2014 |
| EP | 2884629 A2 | 6/2015 |
| EP | 2991195 A1 | 3/2016 |
| JP | H0389821 A | 4/1991 |
| JP | 2003124019 A | 4/2003 |
| WO | WO 2009017430 A1 | 2/2009 |
| WO | WO 2014060228 A2 | 4/2014 |

OTHER PUBLICATIONS

Bott et al, U.S. Pat. No. 8,063,517, Nov. 22, 2011, 2009/0212644, Sep. 27, 2009.
Bott et al, U.S. Pat. No. 8,026,640, Sep. 27, 2011, 2009/0295236, Dec. 3, 2009.
Bott et al, U.S. Pat. No. 7,977,826, Jul. 12, 2011, 2009/0295251.
Bott et al, U.S. Pat. No. 7,755,315, Jul. 12, 2010, 2009/0039713, Feb. 12, 2009.
Bott et al, U.S. Pat. No. 7,777,373, Aug. 17, 2010, 2008/0073985, Mar. 27, 2008.
Bott et al, U.S. Pat. No. 7,285,883, Oct. 23, 2007, 2004/00261553, Dec. 30, 2004.
International Search Report issued by the European Patent Office in International Application PCT/EP2016/076840.
European Search Report dated Jun. 17, 2016 with respect to counterpart European patent application EP 15 19 9587.
Translation of European Search Report dated Jun. 17, 2016 with respect to counterpart European patent application EP 15 19 9587.

* cited by examiner

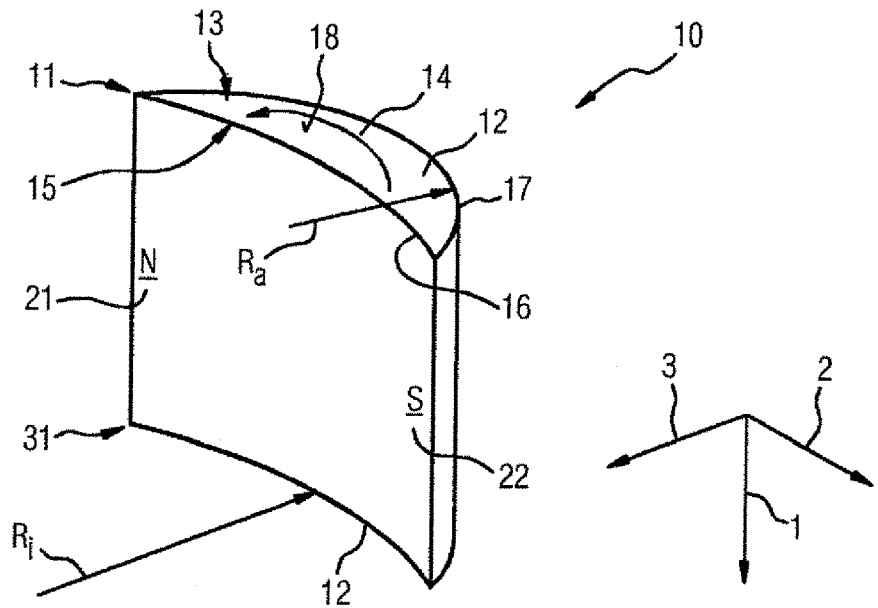
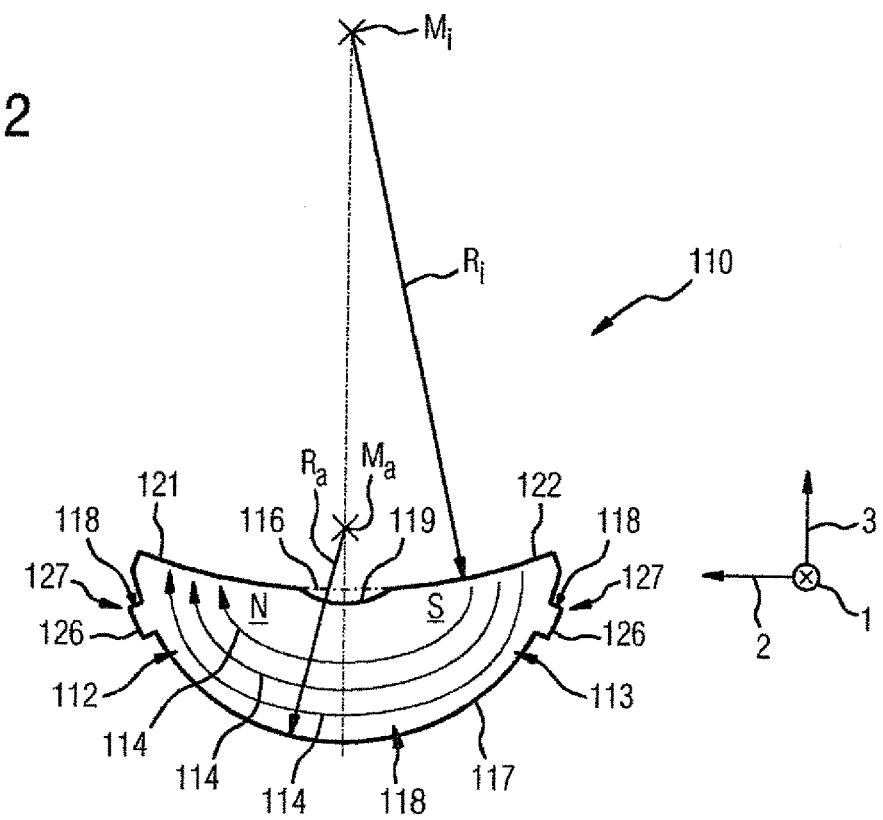

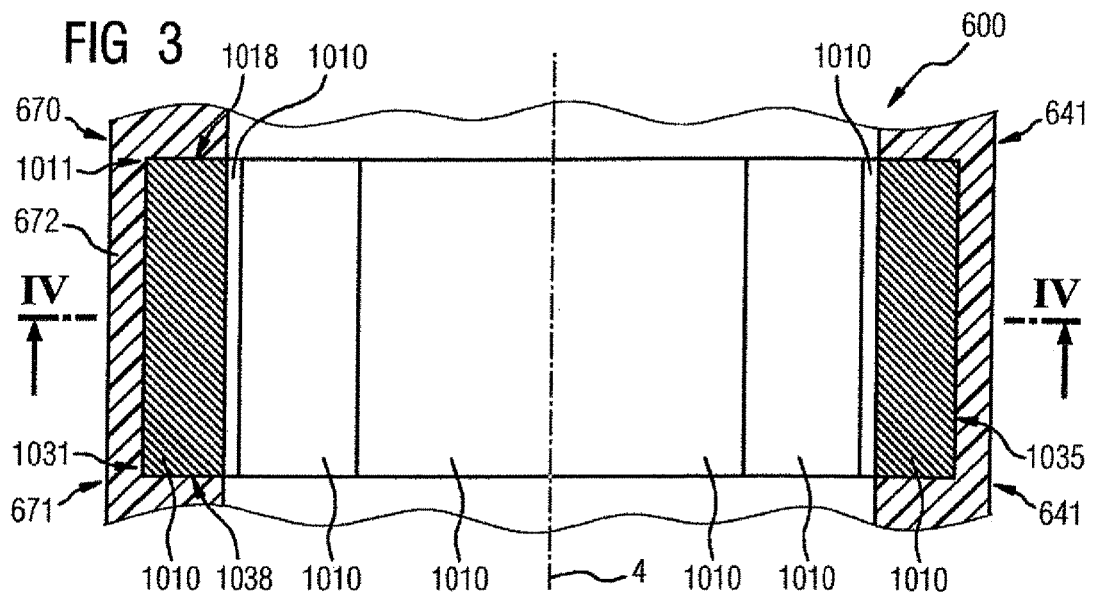
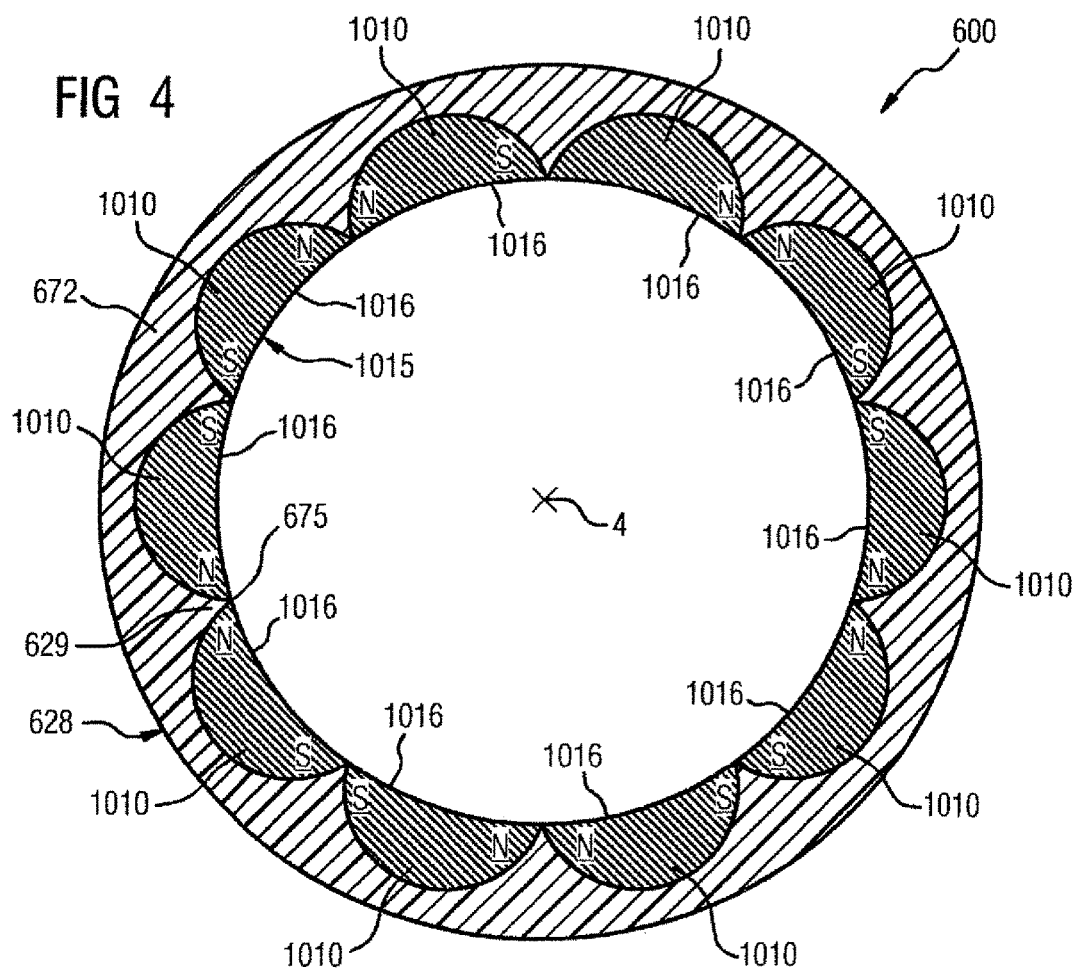

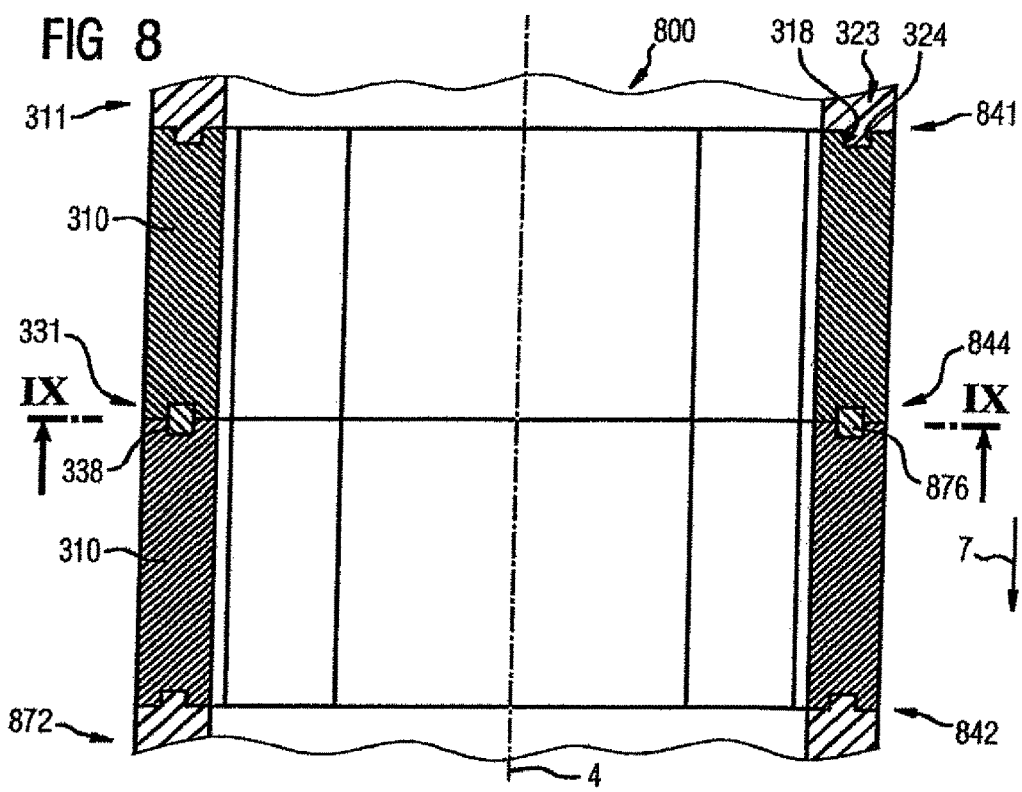
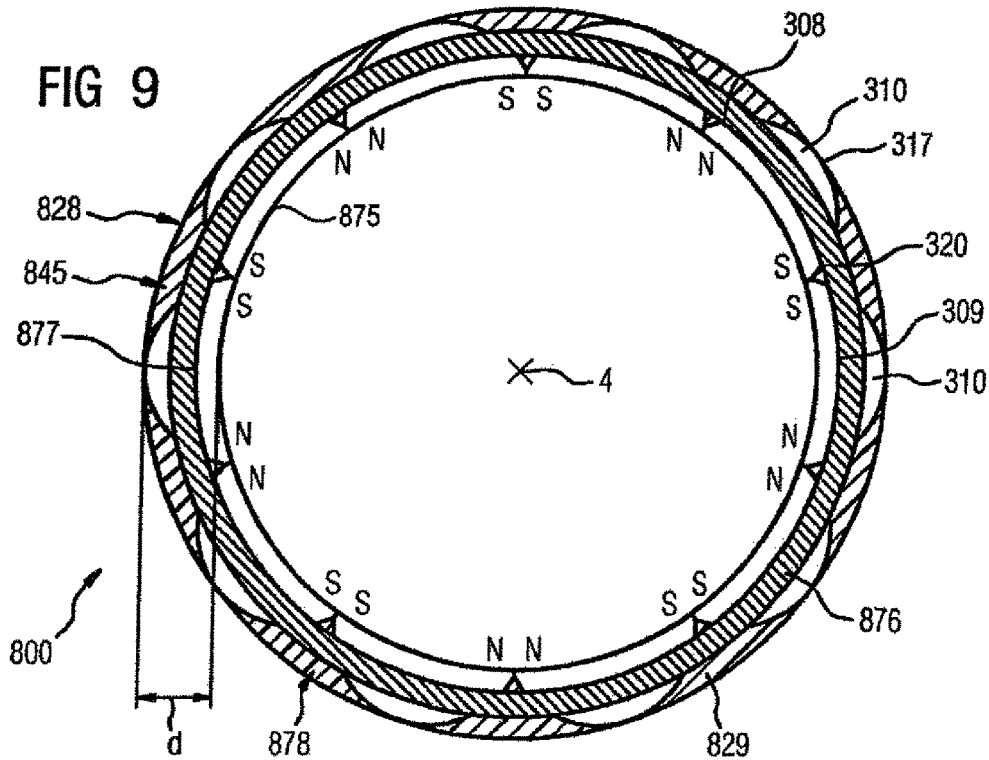

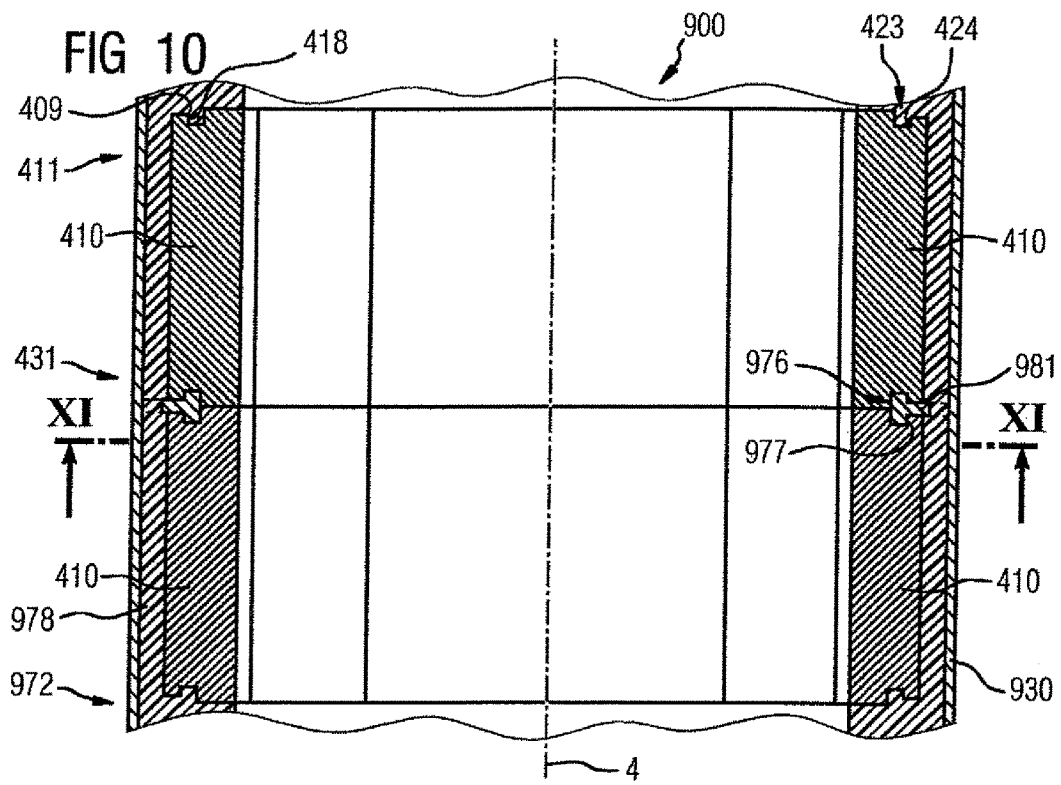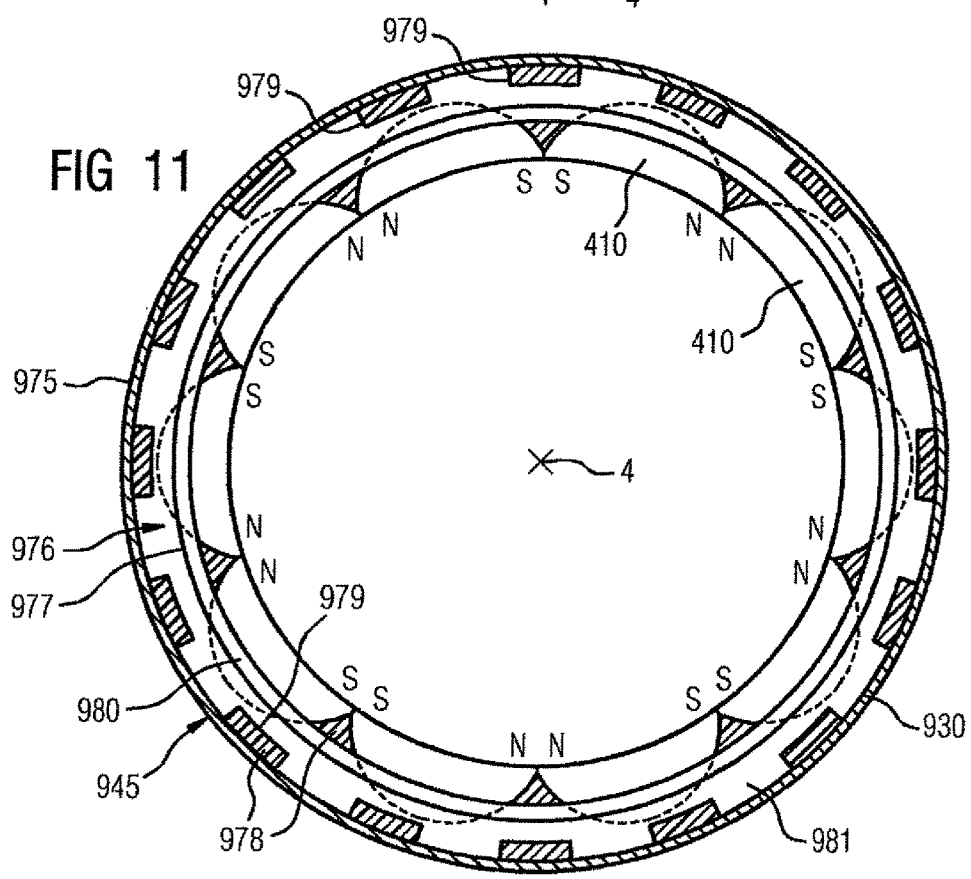

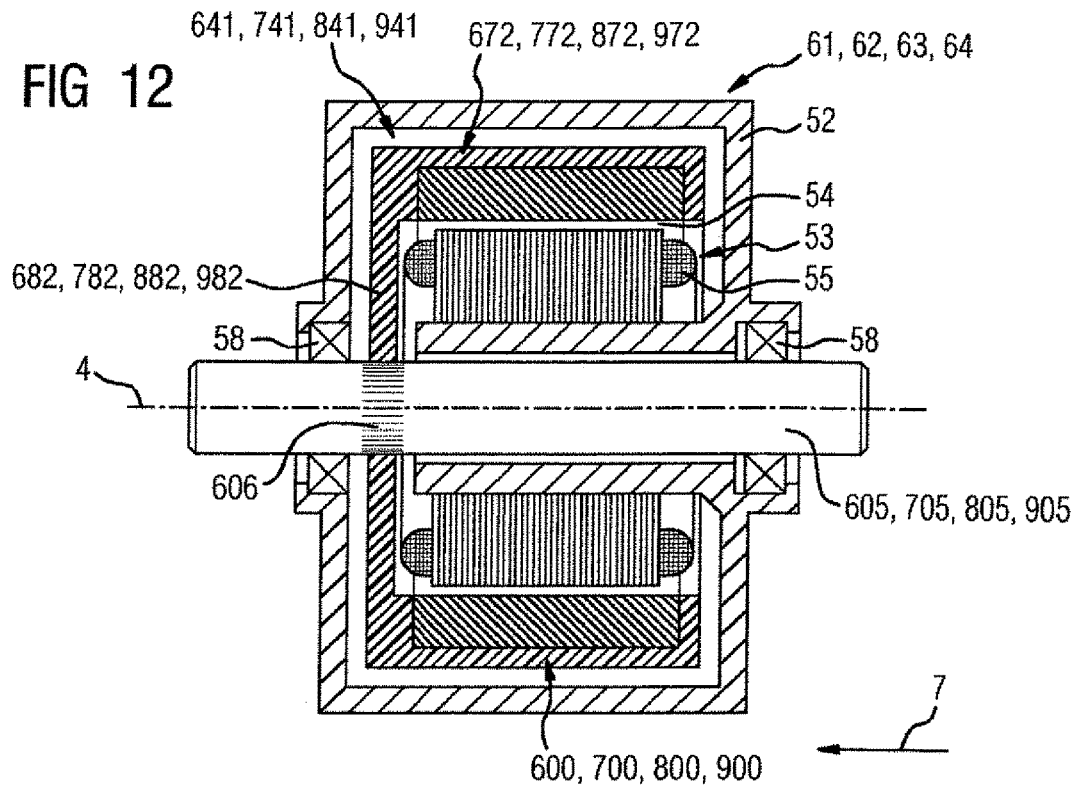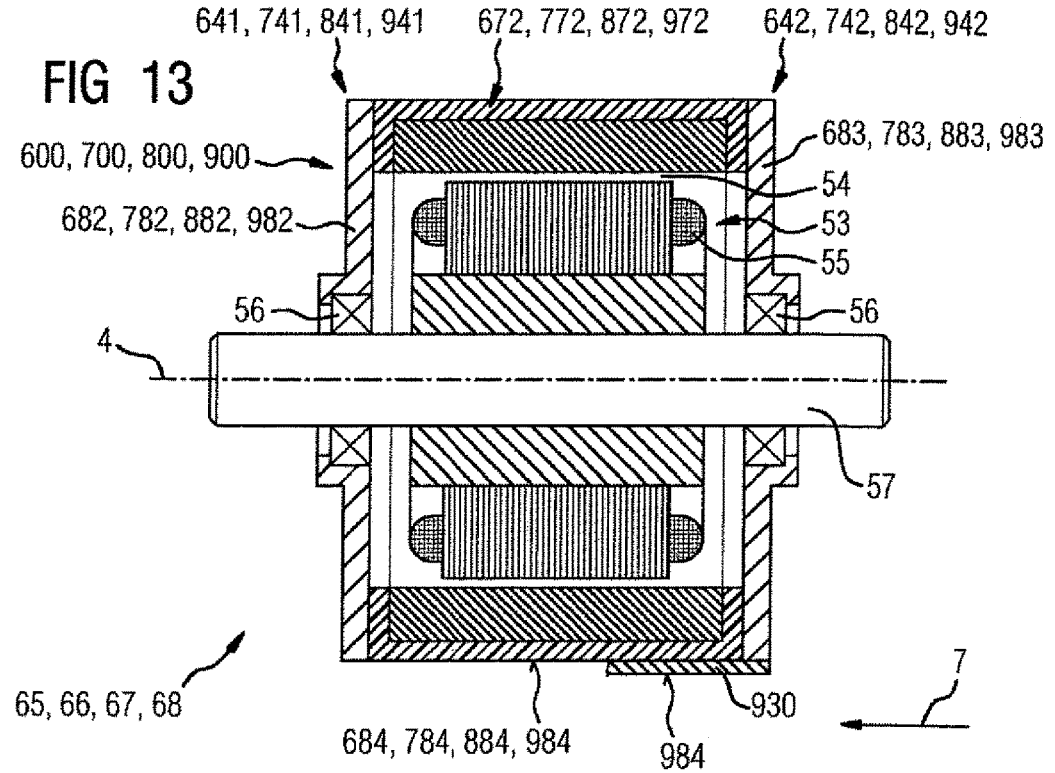

PERMANENT MAGNET ROTOR WITH SICKLE-SHAPED ENVELOPE FOR POLAR PERMANENT MAGNET RUNNING ARCUATELY ALONG THE ROTOR BOUNDARY

CROSS-REFERENCES TO RELATED APPLICATIONS

This application is the U.S. National Stage of International Application No. PCT/EP2016/076840, filed Nov. 7, 2016, which designated the United States and has been published as International Publication No. WO 2017/097511 and which claims the priority of European Patent Application, Serial No. 15199587.5, filed Dec. 11, 2015, pursuant to 35 U.S.C. 119(a)-(d).

BACKGROUND OF THE INVENTION

The invention relates to a permanent magnet for connecting with a connection device of an external rotor machine, comprising
- a north pole and a south pole as the magnetic poles,
- wherein in a cross-section of the permanent magnet a magnetization runs from the south pole to the north pole.

The invention also relates to a rotor for an external rotor machine comprising at least one such permanent magnet, and an external rotor machine comprising the rotor, a vehicle wheel comprising the rotor, and a wind turbine comprising the rotor.

Permanent magnets of this kind are known from EP 1276212 A2. The permanent magnets are described in connection with synchronous electric machines, in particular also external rotor motors or external rotor machines, with these being excited by permanent magnets. The efficiency of these machines is higher than that of electrically excited synchronous machines. Permanent magnets with high energy density, in other words, a high product of flux density and field strength, prove to be superior to less high-energy magnets. It is known that permanent magnets can be used not only in the form of direct assignment to the groove gap, in other words, in a flat arrangement, but also in the manner of a collector configuration (flux concentration). Direct assignment to the groove gap means that the flux density of the magnet is approximately equal to that of the groove gap. This applies at least as long as the groove gap is small in relation to the magnet height. The flux concentration arrangement allows greater flux densities in the groove gap than in the magnet. This is achieved by a large magnet arrangement. The cross-sectional area of the magnet is greater than the pole surface in the groove gap. Accordingly, the flux density in the magnet is less than that in the pole region. For increased torque utilization in the case of a synchronous machine with respect to comparable synchronous machines, optionally in addition to the specified condition for the division ratio of the mean coil width and the pole division width, EP 1276212 A2 proposes arranging the permanent magnets of the rotor in flux concentration. The groove gap induction is thereby raised to well over one tesla without the stator iron being saturated. Air gap inductions are thereby attainable, which correspond to about twice that of known electric synchronous machines. An increase in the thermal torque thereby occurs in EP 1276212 A2 with respect to conventional synchronous machines, with "thermal torque" being taken to mean the maximum continuous torque to be delivered at a predefined temperature. An increase in efficiency is therefore brought about as well as an increase in maximum torque. The utilization of the machine (Nm/kg) is increased by about a factor of 2 compared with conventional synchronous machines. The low mass also establishes an increase in the acceleration capacity.

SUMMARY OF THE INVENTION

The invention is based on the object of making a technical contribution to the prior art, with which inexpensively and in a high quality a permanent magnet for an external rotor machine can be used with a high level of efficiency.

The object is achieved by a permanent magnet for connecting with a connection device of an external rotor machine, which permanent magnet includes
- a north pole and a south pole as the magnetic poles,
- wherein in a cross-section of the permanent magnet a magnetization runs from the south pole to the north pole,
- wherein the cross-section has an envelope with a concave section,
- wherein the envelope has, in the form of a sickle, the concave section and a convex section,
- wherein the permanent magnet runs in an arcuate manner along the convex section,
- wherein the magnetic poles run in an arcuate manner along the concave section.

The object is also achieved by a rotor for an external rotor machine, which rotor includes at least one inventive permanent magnet, wherein the rotor has the connection device for connecting with the permanent magnet, wherein the permanent magnet extends from its first end to its second end, parallel to an axis of rotation, wherein the concave section of the permanent magnet is arranged along a boundary of the rotor.

The object is also achieved by an external rotor machine, which includes an inventive rotor and a stator, which during operation of the external rotor machine magnetically interacts across an air gap with the rotor, wherein the rotor is rotatably mounted about the axis of rotation.

The object is also achieved by a vehicle wheel, which includes an inventive rotor, wherein the vehicle wheel has a rim comprising the rotor.

The object is also achieved by a wind turbine, which includes an inventive rotor, wherein the wind turbine comprises blades which are connected with the rotor.

The object is advantageously achieved in that during operation of an external rotor machine with at least one inventive permanent magnet, by way of the inventive cross-section of which a magnetic flux in the rotor can be advantageously inexpensively conducted through the rotor in a high quality from a south pole to the north pole one of and the same permanent magnet. A high level of efficiency can therefore be advantageously inexpensively achieved in a high quality with an inventive permanent magnet during operation of an external rotor motor. Lateral magnetization with an advantageously small amount of magnetic material can be advantageously inexpensively achieved in a high quality due to the inventive cross-section and the magnetization running from the south pole to the north pole.

The permanent magnet extends from its first end in a first direction to its second end. The cross-section of the permanent magnet extends in a plane which is spanned by a second direction a third direction. The second and third directions run perpendicular to the first direction.

An inventive rotor has the further advantage that the rotor advantageously and inexpensively and in a high quality does not require any ferromagnetic materials for conducting the magnetic flux from or to a magnetic pole of a permanent magnet during operation of the external rotor machine with the rotor. An inventive rotor for an external rotor machine having a high level of efficiency can therefore be advantageously inexpensively achieved in a high quality by using materials of low mass density and/or lower mass volume. For example, the rotor therefore advantageously does not need a lamination stack of electric sheets for conducting the magnetic flux from or to a magnetic pole of a permanent magnet during operation of the external rotor machine.

The mass volume of a device or product is the space-occupying volume of the device or product composed of material, in other words, the volume of the tangible materiality. A solid cylinder is composed, for example, solely of mass volume. In a hollow cylinder, the mass volume does not include the portion of the volume of the cavity of the hollow cylinder.

The envelope of the rotor is the external edge of the rotor, viewed in a cross-section perpendicular to the axis of rotation. The boundary of the rotor runs inside the external edge in this cross-section.

An inventive rotor can have a lightweight construction, which has at least one inventive permanent magnet and at least one lightweight material, with the at least one lightweight material having a lower mass density than an electric sheet, in particular less than 4.6 kg/dm$^3$, with the at least one permanent magnet and the at least one lightweight material filling more than 90% of the mass volume between the boundary and an envelope of the rotor. A high level of efficiency can therefore be advantageously inexpensively achieved in a high quality due to a lower mass density. The mass density of electric sheets is approximately 7.6 kg/dm$^3$. For example, aluminum, magnesium or composites can advantageously be used as a lightweight material. Advantageously, high forces can be absorbed and there can still be a low density of material due to composites, such as CFC composites.

An inventive rotor can have at least two inventive permanent magnets, which extend from its first end to its second end parallel to an axis of rotation, wherein the concave sections of the permanent magnets are arranged at the boundary of the rotor on a circular line running concentrically to the axis of rotation. A more uniform motion of the rotor about the axis of rotation can therefore advantageously be achieved.

A north pole of a permanent magnet can be present along the boundary of the rotor adjacent to the north pole of the permanent magnet closest to the boundary of the rotor. A magnetic pole of an inventive rotor can therefore advantageously inexpensively have the two north poles in a high quality. Advantageously, the distance between the permanent magnet and its closest permanent magnets cannot match the distance between the north pole and the south pole of one and the same permanent magnet.

An inventive external rotor machine has the further advantage that a high-quality electric machine having a high level of efficiency can be advantageously inexpensively provided as an external rotor machine. Advantageously, the moment of inertia of the rotor can be advantageously inexpensively reduced in a high quality due to the use of at least one inventive permanent magnet. A lower moment of inertia can also advantageously be achieved for this purpose by a lower mass and/or size of the rotor. An increase in the acceleration capacity can advantageously also occur. Furthermore, a high-quality external rotor machine with an advantageously small size can be advantageously inexpensively provided due to the inventive cross-section of an inventive permanent magnet.

The connection device can comprise a plastics material. Advantageously, plastics materials, in particular where there is also a high quality requirement, are inexpensive. The connection device with the plastics material and at least one inventive permanent magnet can be produced by advantageously inexpensive methods.

The connection device can have a fastening device, which is connected to the connection device, in particular in one piece, and extends from a first axial end of the rotor to a shaft or a first mounting device of the external rotor machine on an axis of the external rotor machine.

In an inventive external rotor machine, an inventive rotor can be mounted on the shaft with the aid of first and second mounting devices so as to be rotatable around the axis of rotation relative to a stator of the external rotor machine. Alternatively, in an inventive external rotor machine, an inventive rotor can be mounted on the axle with the aid of the first and second mounting devices so as to be rotatable about the axis of rotation relative to a stator of the external rotor machine.

During operation of an inventive external rotor machine with an inventive rotor as the generator, the rotor is caused to rotate about the axis of rotation by mechanical energy. Due to the magnetic interaction between the magnetic poles of the rotor and the stator across an air gap, the mechanical energy can be converted into electrical energy. The electrical energy can be extracted at at least one winding, which is fastened to the stator and contributes to formation of the magnetic poles of the stator, by connecting an electrical load.

During operation of an inventive external rotor machine with an inventive rotor as the motor, electrical energy is supplied via the at least one winding and electrical energy is converted into mechanical energy by the magnetic interaction between the magnetic poles of the stator and an inventive rotor across the air gap. A torque is generated in the process which can cause the rotor to rotate about the axis of rotation and via the rotor it can discharge mechanical energy to a mechanical load in the form of a rotational movement. For this purpose, the mechanical load can be connected with the rotor by a rotationally fixed connection.

An inventive vehicle wheel has the further advantage that the rim can advantageously inexpensively comprise the rotor of an external rotor machine with a high level of efficiency in a high quality, wherein the external rotor machine comprises a stator fastened to the axle of a vehicle, and the vehicle wheel. An inventive vehicle wheel for a vehicle drive with a high level of efficiency can therefore be advantageously inexpensively achieved in a high quality by using materials of low mass density and/or low mass volume. In addition, the vehicle wheel can advantageously inexpensively comprise in a high quality the rotor as part of an external rotor machine in that the rotor can advantageously have the same material as the rim. A vehicle drive can include the external rotor machine.

The rim can be an inventive rotor, having the lightweight construction. Therefore, the at least one inventive permanent magnet and the at least one lightweight material can fill more than 90% of the mass volume between the boundary of the rotor and the envelope of the rim. An inventive vehicle wheel can therefore be advantageously inexpensively used in a high quality for a vehicle drive with a high level of efficiency. The envelope of the rim is the external edge of the rim viewed in a cross-section perpendicular to the axis of rotation.

An inventive wind turbine has the further advantage that the material of the rotor can be advantageously inexpensively selected for a high-quality connection with the blades advantageously independently of material requirements for conducting the magnetic flux into the external rotor machine, which includes a stator fastened to the wind turbine and an inventive rotor.

Furthermore, the wind turbine can advantageously have an inventive rotor having the lightweight construction. Therefore, due to the reduced weight of the rotor, the rotor of an external rotor machine can be advantageously inexpensively mounted at one end of the mast of the wind turbine in a high quality and with a high level of efficiency. The lightweight construction of the rotor can advantageously comprise the blades for this purpose or a hub of the wind turbine, with the hub being connected to the blades.

The blades can be advantageously inexpensively integrally connected in a high quality with the rotor or, due to the similar materials of the lightweight construction of the rotor and the blade, can be advantageously inexpensively connected in a high quality to the rotor by fastening elements. An integral connection can be made for example by producing the blades and the rotor as a unit predominantly from composite fiber materials, or by adhering the blades to the rotor. Adhering can occur advantageously inexpensively in a high quality since the similar materials place the same requirements on the adhesive for a high-quality connection. With connection of the blades to the rotor by fastening elements, comparable material properties of the rotor and blades can advantageously inexpensively result in a high quality in less inhomogeneous loading of the connection.

Advantageous embodiments of the invention are disclosed in the dependent claims. A technical contribution to the advantageous embodiment of an inventive permanent magnet, an inventive rotor, an inventive external rotor machine, an inventive vehicle wheel and/or an inventive wind turbine is advantageously made here with which a permanent magnet for an external rotor machine can inexpensively be used in a high quality with a high level of efficiency.

Therefore, an embodiment of an inventive permanent magnet is advantageous in which the concave section of the envelope is a circular arc having a radius $R_i$ and the convex section of the envelope is a circular arc having a radius $R_a$, wherein the radius $R_i$ is greater than the radius $R_a$. The inventive permanent magnets can therefore advantageously have a small height, with the height being measured as the largest distance between the concave section and the convex distance.

An inventive rotor can therefore have a high pole design, with the rotor having at least ten magnetic poles, in particular at least 24 poles, arranged along the boundary of the rotor around the axis of rotation. Due to the large radius $R_i$ and the small radius $R_a$, the rotor can advantageously be provided with a small extent between the boundary of the rotor and its envelope. Therefore, an inventive rotor can advantageously have a high level of efficiency due to a low moment of inertia.

An inventive rotor can have at least 100 magnetic poles with a diameter of the rotor of at least 1 m. Advantageously, such an inventive rotor with a diameter of at least 1 m having inventive permanent magnets can be provided in a high pole design, particularly advantageously for a wind turbine. The connection device can advantageously have a plurality of segments arranged around the axis of rotation, wherein at least one inventive permanent magnet is connected to a segment. Therefore, an inventive rotor, in particular with a diameter of at least 1 m, can advantageously be assembled from segments during assembly of the rotor, or individual segments can advantageously be replaced. A lamination stack of electric sheets for conducting the magnetic flux to or from a magnetic pole within one segment or between two segments of an inventive permanent magnet is advantageously not necessary during operation of the external rotor machine.

In a further advantageous embodiment of an inventive permanent magnet, the permanent magnet has an axial contour running perpendicularly to the cross-section in a first direction, in particular a recess or a protruding web, which has a surface for connecting the connection device with the permanent magnet by form fit. Advantageously, a uniform distribution of the forces between an inventive permanent magnet and the connection device can therefore occur along the axis of rotation of the rotor. In particular, the axial contour can advantageously extend from the first end of the permanent magnet to the second end of the permanent magnet for this purpose.

In a further advantageous embodiment of an inventive permanent magnet, the permanent magnet has an end face at a first end of the permanent magnet, wherein the end face of the first end has a contour, in particular a recess or a web protruding with respect to the end face, which has within the envelope for connecting the connection device with the permanent magnet by form fit. The surface can advantageously be produced and used in an external rotor machine since the surface advantageously does not require a region of the permanent magnet protruding beyond the envelope. An advantageously large surface for connecting with an external rotor machine with a high level of efficiency can advantageously be compactly provided by the sickle-shaped envelope, and the advantageous arcuate course of the magnetization.

In an inventive permanent magnet, the contour can have a recess in the end face of the first end. Due to the advantageously large surface, an advantageous boundary of the recess can still be achieved despite the recess and material outbreaks can advantageously be avoided at the permanent magnet.

The contour can have a groove. Therefore, force components acting on the permanent magnet parallel to the cross-section can advantageously be absorbed so as to be distributed according to the course of the groove.

In an inventive permanent magnet, the contour can have a web protruding with respect to the end face. For connecting with the connection device, it can therefore advantageously be easily molded.

In a further advantageous embodiment of an inventive permanent magnet, the contour has a circular boundary. Advantageously, the surface can have a large design due to the circular boundary.

In a further advantageous embodiment of an inventive permanent magnet, the contour has a boundary, which extends in an arcuate manner from a first point of the convex section to a second point of the convex section. A force component acting on the permanent magnet parallel to the cross-section relative to the connection device can therefore advantageously be absorbed by the boundary of the contour. In particular, this is advantageous in an inventive rotor, in which forces act in the radial direction.

The connection device can have a connection part, having a circumferential edge for form-fitting connection with the boundary of the contour. The connection of the connection device with the permanent magnet by form fit can therefore have this form-fitting connection. High forces can therefore advantageously be absorbed by the boundary due to the circumferential edge, in particular in an inventive rotor, since the circumferential edge has no beginning and no end and therefore when the forces act on the edge, they are distributed over the entire circumferential edge.

In a further advantageous embodiment of an inventive permanent magnet, the permanent magnet has a recess at the concave section between the north and south poles. In an inventive external rotor machine, the surface of the rotor facing the air gap can therefore advantageously have a recess between the north and south poles of the permanent magnet.

In a further advantageous embodiment of inventive permanent magnet, the permanent magnet runs along the concave section between the north and south poles. In an inventive machine, the surface of the rotor facing the air gap can therefore advantageously have a continuous surface between the north and south poles of the permanent magnet.

In a further advantageous embodiment of an inventive permanent magnet, the permanent magnet is a sintered permanent magnet. An inventive permanent magnet with a high magnetic force can advantageously be used as a component of an inventive rotor or an inventive external rotor machine. A high air gap induction can be compactly achieved due to a high magnetic force.

In a further advantageous embodiment of an inventive rotor, a part of the rotor produced in one piece from one material comprises a force-transmitting device and the part includes more than 90% of the mass volume of the connection device. Therefore, the force-transmitting device can advantageously be produced as a component of an inventive rotor for a particular application of the rotor. In addition to advantageously inexpensive production, the force transmission between the rotor and application product can advantageously occur in a high quality and advantageously inexpensively, for example, compactly and/or in a material-saving manner, with a high level of efficiency. The force-transmitting device can, for example, be a pulley for a belt drive, a rim of a vehicle wheel or a hub of a wind turbine.

In a further advantageous embodiment of an inventive rotor, the rotor has the connection with the end face at the first end of the permanent magnet at a first axial end of the rotor and the rotor has a second connection of the connection device with an end face at the second end of the permanent magnet. Therefore, the permanent magnets can advantageously be connected to the rotor by a connection with its two end faces and therefore advantageously be fastened, in particular advantageously within the boundary of the rotor.

In a further advantageous embodiment of an inventive rotor, the rotor has a second connection in a rotor section between the first and a second axial end of the rotor and the rotor has at least one further permanent magnet between the rotor section and the second axial end. Advantageously, a plurality of permanent magnets can therefore be fastened to the rotor one behind the other in the axial direction.

In a further advantageous embodiment of an inventive rotor, the connection device in a cross-section of the rotor extends annularly adjacent to the permanent magnet and concentrically to the boundary of the rotor. An advantageously uniform distribution of the forces acting on the permanent magnet can therefore advantageously be achieved and at the same time there is advantageously a slight, ideally no, interruption in the surface between successively arranged permanent magnets in the case of a plurality of permanent magnets one behind the other in the axial direction.

In a further advantageous embodiment of an inventive rotor, the permanent magnet is embedded in the connection device. Therefore, the demands on the dimensional accuracy of the permanent magnet can be advantageously low since the connection device fills the gaps created by a lack of dimensional accuracy of the permanent magnet. Therefore, for example mechanical post-processing of a permanent magnet after sintering can advantageously be omitted.

In a further advantageous embodiment of an inventive rotor, the at least one inventive permanent magnet is at least firmly bonded with the connection device. For this purpose, an inventive permanent magnet has the surface at least for the connection of the connection device with the permanent magnet by an adhesive bond. If the connection device is designed such that during operation of an inventive external rotor machine, centrifugal forces press the inventive permanent magnets against a surface of the connection device, an inventive permanent magnet can at least be fixed, in particular fastened, by a firmly-bonded connection of the connection device with the permanent magnet. A form fitting connection can advantageously be omitted in the case of fastening of the permanent magnet by a firmly-bonded connection. For this purpose, a firmly-bonded connection can be made at one surface of the end face of the first end of an inventive permanent magnet and/or a connecting surface between the permanent magnet and the connection device along the first direction. Due to its advantageously large extent, the connecting face can advantageously distribute the forces acting on the permanent magnet along the firmly-bonded connection. In particular, the connecting face is advantageously larger in the case of $R_i > R_a$ compared to the surfaces of the magnetic poles, in other words, north and south poles. The surface of the end faces can advantageously be designed as a plane.

The permanent magnet can be firmly bonded over a plane with the connection device, with the surface of the end face having the plane. A plane can be produced with advantageously simple movement sequences using advantageously simple tools.

In a further advantageous embodiment of an inventive permanent magnet, a surface and/or connecting surface of the permanent magnet for the connection of the connection device with the permanent magnet by an adhesive bond is unprocessed. Therefore, a high-quality firmly-bonded connection can be advantageously inexpensively achieved without a coating, which advantageously enables the transmission of large forces from an inventive permanent magnet to a connection device since a firmly-bonded layer between the connection device and the permanent magnet adheres better to the surface because of its roughness. For example, post-processing of the surface for the connection can advantageously be dispensed with after sintering of the permanent magnet.

In a further advantageous embodiment of an inventive permanent magnet, a surface and/or connecting face of the permanent magnet has a coating for connecting the connection device with the permanent magnet by an adhesive bond. A high-quality firmly-bonded connection can therefore be advantageously inexpensively achieved which advantageously achieves a transmission of large forces by an adhesive bond between the connection device and the coating and an inventive permanent magnet. Here, the surface can be unprocessed or processed prior to applying the coating to the permanent magnet.

BRIEF DESCRIPTION OF THE DRAWING

Advantageous embodiments of inventive permanent magnets, inventive rotors and inventive external rotor machines and inventive uses advantageously result through combination of some or a plurality of the described features. The above-described properties, features and advantages of this invention and the manner in which they are achieved will become clearer and clearly understood in connection with the following description of exemplary embodiments, which are illustrated in more detail with reference to the figures, in which:

FIG. 1 shows a first exemplary embodiment of an inventive permanent magnet,

FIG. 2 shows a view of a second exemplary embodiment of an inventive permanent magnet onto an end face, FIG. 3 shows a longitudinal section through a first exemplary embodiment of an inventive rotor, FIG. 4 shows a cross-section of the rotor of FIG. 3 along line IV-IV, FIG. 8 shows a longitudinal section through a fourth exemplary embodiment of an inventive rotor, which has the inventive permanent magnets of FIG. 9, FIG. 9 shows a cross-section of the rotor of FIG. 8 along line IX-IX, FIG. 10 shows a longitudinal section through a fifth exemplary embodiment of an inventive rotor, which has the inventive permanent magnets according to a fifth exemplary embodiment, FIG. 11 shows a cross-section of the rotor of FIG. 10 along line XI-XI, FIG. 12 shows exemplary embodiments of the inventive external rotor machine, FIG. 13 shows exemplary embodiments of further inventive external rotor machines.

DETAILED DESCRIPTION OF PREFERRED EMBODIMENTS

Figure 5:
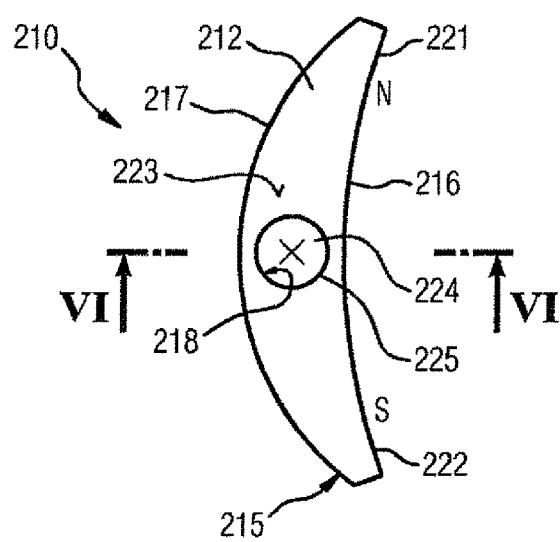
FIG. 5 shows a view of a third exemplary embodiment of an inventive permanent magnet onto an end face.

FIG. 1 shows a first exemplary embodiment of an inventive permanent magnet 10, comprising a north pole 21 and a south pole 22 as the magnetic poles. The permanent magnet 10 also comprises the end faces 12 at a first end 11 and at a second end 31. In a cross-section 13 of the permanent magnet 10, a magnetization 14 runs from the south pole 22 to the north pole 21, with the cross-section 13 having an envelope 15 with a concave section 16 and the magnetic poles running in an arcuate manner along the concave section 16. The permanent magnet 10 provides the north pole 21 and south poles 22 along the concave section 16 on one side of the permanent magnet 10 by way of the lateral magnetization 14. In the exemplary embodiment of FIG. 1, the end face 12 has at the first end 11 the cross-section 13 of the permanent magnet 10. The permanent magnet 10 extends from its first end 11 in a first direction to the second end 31, with all cross-sections along the first direction 1 having the same envelope 15. The envelope 15 has, in the form of a sickle, the concave section 16 and a convex section 17, with the permanent magnet 10 running along the convex section 17 in an arcuate manner. At least one of the end faces 12 has within the envelope 15 a surface 18 for the connection 670 of a connection device 672 with the permanent magnet 10. A height of the permanent magnet 10 is measured as the largest distance between the concave section 16 and the convex section 17. The cross-section 13 of the permanent magnet 10 extends in a plane which is spanned by a second direction 2 and a third direction 3. The second direction 2 and the third direction 3 run perpendicular to the first direction 1. The end face 12 of the first end 11 has the surface 18 at least for the connection 670 of the connection device 672 with the permanent magnet 10 by an adhesive bond. In the exemplary embodiment of FIG. 1, the end face 12 at the first end 11 is formed by the surface 18 which is a plane. The permanent magnet 10 runs between the north pole 21 and south pole 22 along the concave section 16. The concave section 16 of the envelope 15 is a circular arc with a radius $R_i$ and the convex section 17 of the envelope 15 is a circular arc with a radius $R_a$, with the radius $R_i$ being greater than the radius $R_a$. The radii $R_a$, $R_i$ are symbolically marked in FIG. 1 by arrows. The permanent magnet 10 is a sintered permanent magnet. The surfaces 18 of the end faces 12 at the first end 11 and at the second end 31 of the permanent magnet 10 are not processed in this exemplary embodiment since post-processing of the surfaces 18 after sintering of the permanent magnet 10 has advantageously been omitted for a firmly-bonded connection with a connection device of an external rotor machine.

FIG. 2 shows a view of a second exemplary embodiment of an inventive permanent magnet 110 onto an end face 112. This exemplary embodiment has features which were described with reference to FIG. 1. The features are provided in FIG. 2 for the most part with reference numerals, which originated from the reference numerals of FIG. 1 by prefixing a '1'. Therefore, for example, the description of the convex section 17 of FIG. 1 should be transferred accordingly to a convex section 117 of FIG. 2. The different characteristics of the permanent magnet 110 of FIG. 2 with respect to the permanent magnet 10 of FIG. 1 will be discussed below. The permanent magnet 110 of FIG. 2 has a recess 119 between the north pole 121 and south pole 122 on the concave section 116. The permanent magnet 110 has an axial contour 127 running perpendicularly to the cross-section 113 in a first direction 1, which contour has a surface 118 for connecting the connection device with the permanent magnet 110 by form fit. In the exemplary embodiment of FIG. 2, the axial contour 127 is a protruding web 127. In the exemplary embodiment of FIG. 2, the permanent magnet 110 has two protruding webs 127, which are located on the convex section 117. The center points $M_i$, $M_a$ relating to the radii $R_a$, $R_i$ have been drawn in FIG. 2.

FIG. 3 shows a longitudinal section through a first exemplary embodiment of an inventive rotor 600, comprising at least one permanent magnet 1010, with the permanent magnet 1010 extending from its first end 1011 to its second end 1031 parallel to an axis of rotation 4, with the rotor 600 having the connection device 672 and the connection 670 between the connection device 672 and the surface 1018 of the permanent magnet 1010. The permanent magnet 1010 of FIG. 3 has the features of the permanent magnet 10 of FIG. 1 provided for the most part with reference numerals, with the reference numerals of FIG. 1 having been preceded by "10". The permanent magnet 1010 of FIG. 3 has at the surfaces 1018, 1038 a coating. Therefore, better adhesion is achieved between the permanent magnet 1010 and the plastics material, and this can form a connection at least between the coating and the plastics material, which is comparable to a connection based on atomic forces. The connection device 672 has a plastics material, which forms the connection with the permanent magnet 1010 by an adhesive bond with the coating thereof. The plastics material also fills a mass volume 629 of the connection device 672 between the permanent magnets 1010. For forming the connections 670, 671 of the connection device 672 with the surfaces 1018, 1038 of the end faces at the first end 1011 and the second end 1031 of the permanent magnet 1010, the plastics material of the connection device 672 is heated, so the connections 670, 671 are formed by an adhesive bond. The rotor 600 has the connection 1018 at a first axial end 641 of the rotor 600 and the rotor 600 has the second connection 671 of the connection device with the end face at the second end 1031 of the permanent magnet 1010. The connections 670, 671 of the permanent magnets 1010 with the connection device 672 are produced by injection molding. Here, the permanent magnets 1010 are positioned accordingly and plastics material for the connection device 672 provided by injection molding between the permanent magnets 1010 and the first and second ends 1011, 1031 of the permanent magnets 1010. Here, the first connection 1018 and the second connection 1038 on the end faces of the permanent magnets 1010 are formed by an adhesive bond. The permanent magnets 1010 are embedded in the connection device 672. The end faces of the first and second ends 1011, 1031, have the surfaces 1018, 1038 for connections 670, 671 of the connection device 672 with the permanent magnet 1010 within the envelope 1015 of the cross-section of the permanent magnets 1010. Depending on if and how the coating is also present on the permanent magnets 1010 along the first direction 1, the permanent magnets 1010 are also firmly bonded with the connection device 672 at connection surfaces 1035 present along the first direction 1.

FIG. 4 shows a cross-section of the rotor 600 of FIG. 3 along line IV-IV. The rotor 600 includes a permanent magnet 1010, with the concave section 1016 of the permanent magnet 1010 being arranged along a boundary 675 of the rotor 600. The rotor 600 has at least two permanent magnets 1016 extending from its first 1011 to its second end 1031 parallel to the axis of rotation 4, with the concave portions 1016 of the permanent magnets 1010 being arranged at the boundary 675 of the rotor 600 on a circular line running concentrically to the axis of rotation 4. In FIG. 4, the circular line is indistinguishable from the boundary 675 of the rotor 600 since it completely covers the circular line, at least from the perspective of the pictorial representation and therefore the circular line in FIG. 4 is identical to the boundary 675 of the rotor 600. A north pole of a permanent magnet 1010 is present along the boundary 675 of the rotor 600 adjacent to the north pole of the permanent magnet 1010 closest to the boundary 675 of the rotor 600. The envelope 628 of the rotor 600 is the external edge of the rotor viewed in a cross-section perpendicular to the axis of rotation 4. The boundary 675 of the rotor 600 runs inside the external edge in this cross-section. The rotor 600 has a high pole design, with the rotor 600 having ten magnetic poles arranged around the axis of rotation 4 along the boundary 675 of the rotor 600. A north pole N of a permanent magnet 1010 is present along the boundary 675 of the rotor 600 adjacent to the north pole N of the permanent magnet 1010 closest to the boundary 675 of the rotor 600.

FIG. 5 shows a view of a third exemplary embodiment of an inventive permanent magnet 210 onto an end face 212. This embodiment has features that were described with reference to FIG. 1. The features are for the most part provided in FIG. 5 with reference numerals, which originated from the reference numerals of FIG. 1 by prefixing a "2". The end face 212 of the first end of the permanent magnet 210 has a contour 223, which has the surface 218 for connection of the connection device 772 with the permanent magnet 210 by form fit. The contour 223 has a circular boundary 225, on which the surface 218 extends in a recess 224.

Figure 6:
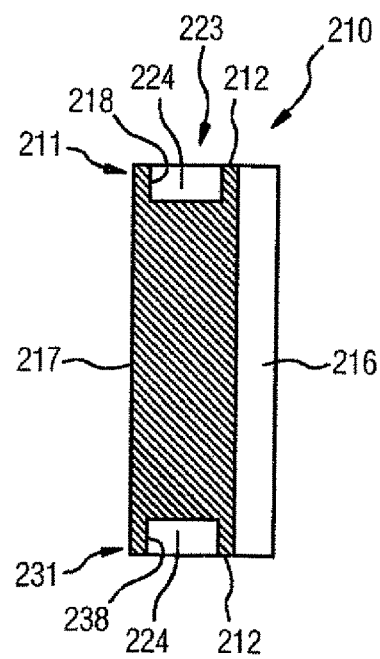
FIG. 6 shows a longitudinal section of the permanent magnet of FIG. 5 along line VI-VI.

FIG. 6 shows a longitudinal section of the permanent magnet 210 of FIG. 5 along line VI-VI. The contour 223 of the permanent magnet 210 has the recess 224 in the end face 212 of the first end 211. The permanent magnet 202 has analogously thereto at the second end 231 of the permanent magnet 210 a contour having the surface 238 for the second connection of the connection device 772 with the permanent magnet 210 by form fit. In a further exemplary embodiment of an inventive permanent magnet, in which the contour has a web protruding with respect to the end face, the surfaces for the form-fitting connection are not in the recess 224, but on the protruding web.

Figure 7:
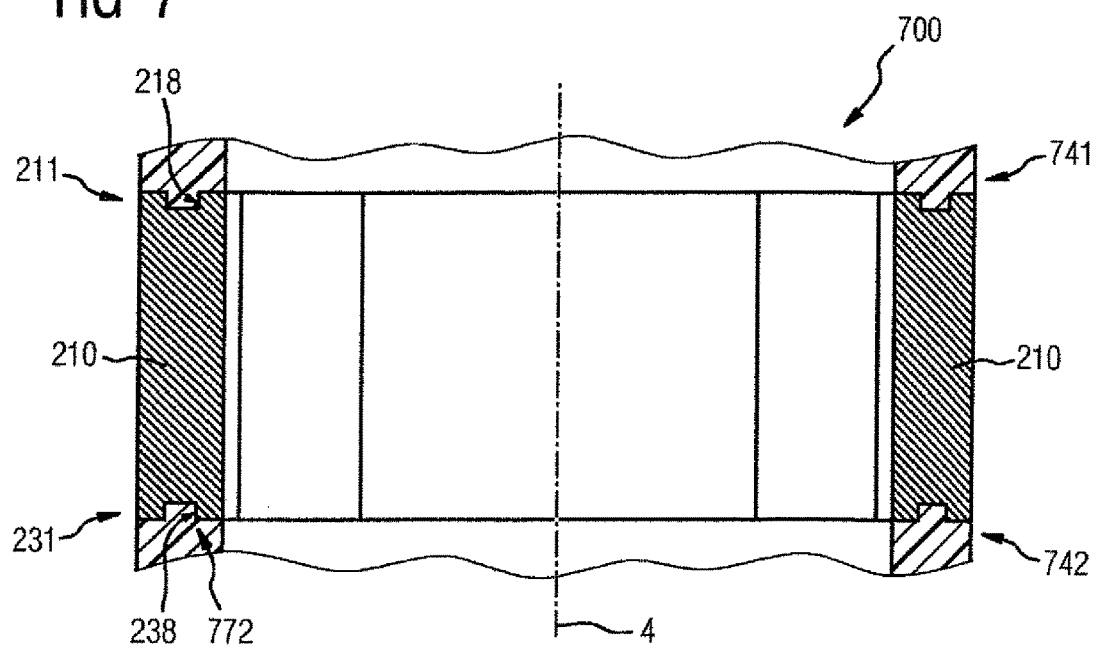
FIG. 7 shows a longitudinal section through a third exemplary embodiment of an inventive rotor, which has the inventive permanent magnets of FIG. 5.

FIG. 7 shows a longitudinal section through a third exemplary embodiment of an inventive rotor 700 of the inventive permanent magnets 210 of FIG. 5. This exemplary embodiment also has features that were described with reference to FIG. 3 and FIG. 4. The features are provided in FIG. 7 with reference numerals, which originated from the reference numerals of FIGS. 3 and 4 by replacing the first digit "6" with a "7". The rotor 700 has the connection by form fit at the first axial end 741 of the rotor 700 and the rotor has a second connection by form fit of the connection device 772 with the end face at the second end 231 of the permanent magnet 210. In the rotor 700, the permanent magnets 210 are also embedded in the connection device 772 by the connection device being produced by injection molding with an injection molding tool 772, with the permanent magnets 210 being arranged with their concave section 216 at the boundary of the rotor 700 on a circular line running concentrically to the axis of rotation 4.

FIG. 8 shows a longitudinal section through a fourth exemplary embodiment of an inventive rotor 800, having inventive permanent magnets 310 according to FIG. 9. This exemplary embodiment also has features that were described with reference to FIG. 7. The features are provided in FIG. 8 with reference numerals that originated from the reference numerals of FIG. 7 by replacing the first digit "7" with an "8". The rotor 800 has the connection at the first axial end 841 of the rotor 800 by form fit and the rotor 800 has a second connection of the connection device 872 with the end face at the second end 331 of the permanent magnet 310. The rotor 800 has the second connection in a rotor section 844 between the first axial end 841 and the second axial end 842 of the rotor 800, and the rotor 800 has at least one further permanent magnet 310 between the rotor section 844 and the second axial end 842. Therefore, a plurality of permanent magnets 310, namely two permanent magnets 310, is/are arranged on the rotor 800 one behind the other in the axial direction 7.

FIG. 9 shows a cross-section of the rotor 800 of FIG. 8 along line IX-IX. The connection device 872 in a cross-section 845 of the rotor 800 extends annularly adjacent to the permanent magnet 310 and concentrically to the boundary 875 of the rotor 800. For this purpose, the connection device 872 has a ring as a connection part 876. The rotor 800 of FIG. 9 has inventive permanent magnets 310 according to a fourth exemplary embodiment of an inventive permanent magnet 310. The fourth exemplary embodiment of inventive permanent magnets also has features, which were described with reference to FIG. 1. The features are provided in FIG. 8 and FIG. 9 with reference numerals, which originated from the reference numerals of FIG. 1 by replacing the first number in "1" with a "3". The contour 323 has a recess 324 in the end face of the first end 311 of the permanent magnet 310. The contour 323 has a groove formed by the recess 324. The contour 323 has a boundary 309 which extends in an arcuate manner from a first point 308 of the convex section 317 to a second point 320 of the convex section 317. The connection part 876, in other words, the ring of the connection device 872, has a circumferential edge 877 for a form-fitting connection with the boundary 309 of the contour 323. The connection part 876 therefore runs in the groove of two permanent magnets 310 arranged one behind the other in the axial direction 7. Between a permanent magnet 310 and the permanent magnet 310 closest to it on the boundary 875 of the rotor 800, the connection part 876 is connected to a casting 878 which has the connection device 872. So, due to the strength of the ring, the permissible centrifugal forces can advantageously adopt high values during operation of the rotor 800 without damage to the rotor 800, the connection part 876 is made of a steel, a carbon fiber-reinforced plastics material or a glass fiber-reinforced plastics material. The use of these materials is advantageously inexpensively possible in a high quality in the rotor 800 since the centrifugal forces subject the material of the ring 876 to tensile stress. During production of the rotor 800, the permanent magnets 310 can advantageously be positioned in an injection molding tool so as to be at least partially be fixed to the connection part 876, and the casting 878 is produced by injection molding with an injection molding material. The injection material comprises a plastics material. Advantageously, in particular in the exemplary embodiment with the connection part 876 and the plastics material, the extension 800 of the rotor between the boundary 875 of the rotor 800 and its envelope 828 is low and corresponds to the thickness d of a permanent magnet 310. In this embodiment, the plastics material ideally fills only the mass volume 829 of the connection device 872 between the permanent magnets 310.

FIG. 10 shows a longitudinal section through a fifth exemplary embodiment of an inventive rotor 900, having inventive permanent magnets 410 according to a fifth exemplary embodiment. The fifth exemplary embodiment of the permanent magnet 410 also has features which have been described with reference to FIG. 1, FIG. 8 and FIG. 9. The features are provided in FIG. 10 with reference numerals and can be provided with reference numerals, which originated from the reference numerals of FIG. 1, FIG. 8 and FIG. 9 by replacing the first digit "8" with a "9" or by prefixing a "4". The permanent magnet 410 has, as in the fourth exemplary embodiment, a contour 423 with a groove, which has a boundary 409 which extends in an arcuate manner from the first point of the convex section to the second point of the convex section. In addition, the recess 424 with a smaller depth, compared to the groove, extends to the convex section of the permanent magnet 410.

FIG. 11 shows a cross-section of the rotor 900 of FIG. 10 along line XI-XI. The connection device 972 in a cross-section 945 of the rotor 900 extends annularly adjacent to the permanent magnet 410 and concentrically to the boundary 975 of the rotor 900. For this purpose, the connection device in the cross-section 945 of the rotor 900 has a connection part 976 which has a circumferential edge 977 for a form fitting connection with the boundary 409 of the contour 423 of the permanent magnet 410. The connection part 976 extends in radial directions perpendicularly to the axis of rotation 4 to a sleeve 930, with the circumferential edge delimiting an inner region 980 designed with a greater thickness from an outer region 981 of the connection part 976 designed with a smaller thickness. In the exemplary embodiment of FIG. 10 and FIG. 11, the connection part 976 extends annularly from its circumferential edge 977 to the sleeve 930. The connection part 976 is segmented along the sleeve 930 by successive recesses 979. Therefore, the rotor 900 can be advantageously inexpensively fastened in a high quality with an interference fit in the sleeve 930 and centering of the permanent magnets 410 in relation to the axis of rotation 4 can advantageously also be achieved. The casting 978 extends in spaces between the permanent magnets 410. In the exemplary embodiment, a plastics material was injected into the spaces for this purpose. The sleeve 930 is made of brass.

FIG. 12 shows exemplary embodiments of inventive external rotor machines 61, 62, 63, 64. These exemplary embodiments have features which have already been described with reference to FIG. 1 to 12. These are not provided with reference numerals in FIG. 12 but could be provided with the reference numerals as in FIG. 1 to 11 and be described by the accompanying description. The external rotor machines will be described hereinafter, with the reference numerals of all exemplary embodiments being indicated. For example, the description of the first exemplary embodiment with the reference numeral 61 can be limited to limited to the reference numerals of the features of the external rotor machine with reference numeral 61 by the reference numerals of a feature cited in second to fourth positions being deleted. Accordingly, the description of a second embodiment with reference numeral 62 is obtained by deleting the reference numerals of a feature cited in the first and third and fourth positions. The external rotor machines 61, 62, 63, 64 comprises a rotor 600, 700, 800, 900 and a stator 53, which during operation of the external rotor machines 61, 62, 63, 64 magnetically interacts across an air gap 54 with the rotor 600, 700, 800, 900, with the rotor 600, 700, 800, 900 being rotatably mounted about the axis of rotation 4. The rotor 600, 700, 800, 900 is fastened to a shaft 605, 705, 805, 905 and via this shaft can be mounted with a first and a second mounting device 58 in a housing 52 of the external rotor machine 61, 62, 63, 64 so as to be rotatable about the axis of rotation 4. The stator 53 is fastened in the housing 52 so as to be rotationally fixed and has at least one winding 55 which extends in the axial direction 7 of the axis of rotation 4 along the air gap 54. For fastening the rotor 600, 700, 800, 900 to the shaft 605, 705, 805, 905, the connection device 672, 772, 872, 972 has an attachment means 682, 782, 882, 982, which is connected, in particular in one piece, with the connection device 672, 772, 872, 972 so as to be rotationally fixed and extends between the first axial end 641, 741, 841, 941 of the rotor 600, 700, 800, 900 and the shaft 605, 705, 805, 905. For fastening to the shaft 605, 705, 805, 905, the shaft 605 can for example have a knurling 606. Due to the fastening to the shaft 605, 705, 805, 905, the fastening means 682, 782, 882, 982 is a force-transmitting device. In the exemplary embodiments of FIG. 12, the connection device 672, 772, 872, 972 therefore has an integrally produced part of the rotor 600, 700, 800, 900 which comprises a force-transmitting device and more than 90% of the mass volume of the connecting device. In the inventive rotors, inventive external rotor machines 61, 62, 63, 64 with a housing 52 according to FIG. 12 can be achieved with advantageously small dimensions since the rotors 600, 700, 800, 900 between the stator 53 and the housing 52 occupy an advantageously small space in radial directions perpendicular to the axial direction 7.

FIG. 13 shows exemplary embodiments of further inventive external rotor machines 65, 66, 67, 68. In the description of the exemplary embodiments and the exemplary embodiments described below with reference to FIG. 14 to FIG. 16, the procedure is similar to the procedure in FIG. 12. The external rotor machine 65, 66, 67, 68 comprises a rotor 600, 700, 800, 900 and a stator 53, which during operation of the external rotor machine 65, 66, 67, 68 magnetically interacts across an air gap 54 with the rotor 600, 700, 800, 900, with the rotor 600, 700, 800, 900 being rotatably mounted about the axis of rotation 4 with the aid of first and second mounting devices 56 on an axis 57 relative to a stator 59 of the external rotor machine 65, 66, 67. The stator 59 is rotatably fastened to the axle 57 and has at least one winding 55 which extends in the axial direction 7 of the axis of rotation 4 along the air gap 54. For rotatable mounting of the rotor 600, 700, 800, 900 on the axle 57, the connection device 672, 772, 872, 972 has a fastening means 682, 782, 882, 982, which is connected, in particular in one piece, with the connection device and extends between the first axial end 641, 741, 841, 941 of the rotor 600, 700, 800, 900 and the first mounting device 56. Unlike in the exemplary embodiments of FIG. 12, the connection device 672, 772, 872, 972 of FIG. 13 also has a second fastening means 683, 783, 883, 983, which is connected, in particular in one piece, with the connection device 672, 772, 872, 972 and extends between the second axial end 642, 742, 842, 942 of the rotor 600, 700, 800, 900 and the first mounting device 56. An external surface 684, 784, 884, 984 of the rotor extending along the axis of rotation 4 can serve as a force-transmitting device to a mechanical load or as a mechanical load here. The fifth exemplary embodiment of the rotor 900 has, for example, a sleeve 930 made of brass, so the external surface 984 is designed sufficiently solidly in order to use this external rotor machine 68 as a robust roller drive, in which by way of a frictional connection between goods to be transported and the external surface 984, the goods to be transported are moved during operation of the external rotor machine 68.

Figure 14:
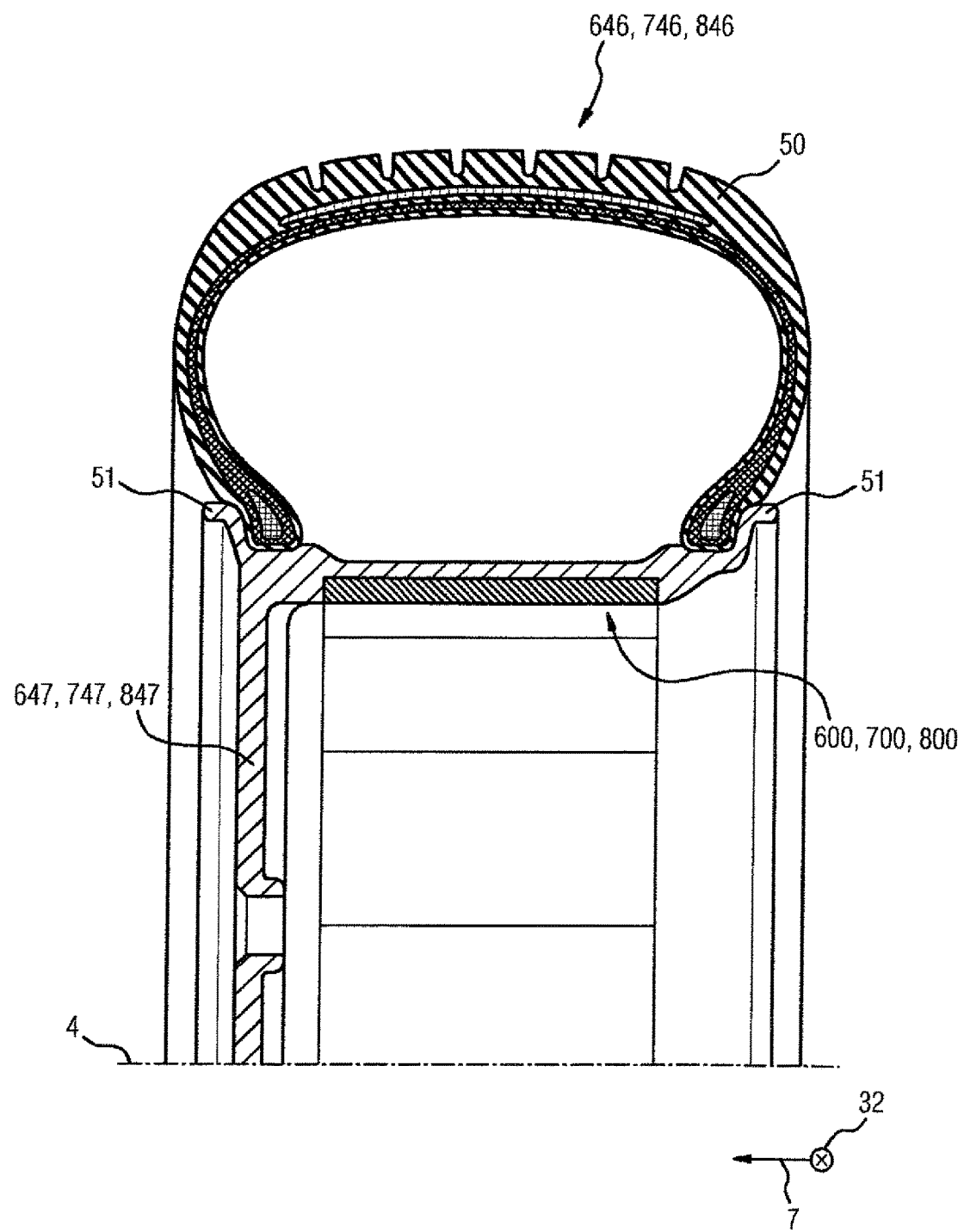
FIG. 14 shows exemplary embodiments of the inventive vehicle wheels.

FIG. 14 shows exemplary embodiments of the inventive vehicle wheels 646, 746, 846. The vehicle wheel 646, 746, 846 has a rim 647, 747, 847, which comprises a rotor 600, 700, 800. In FIG. 14, for simplicity, only the portion of the vehicle wheels 646, 746, 846 above the axis of rotation 4 is shown. The rim 647, 747, 847 has a guiding edge 51 which serves to guide the vehicle wheel 646, 746, 846 along a path when driving a vehicle with the vehicle wheel 646, 746, 846. With vehicle wheels 647, 747, 847 which have a tire 50, as a rule, a further guiding edge 51 is provided on the rim 647, 747, 847 so the tire 50 follows the movement of the rim 647, 747, 847 in the direction of travel 32 to the necessary extent, in other words, the deviations in movement in the axial direction 7 between rim 647, 747, 847 and tire 50 is at least so low that the tire 50 does not detach in the axial direction 7 from the rim 647, 747, 847 during driving, with axial direction of course also being intended to mean the "negative" axial direction, in other words, counter to the arrowhead drawn in FIG. 14. In the exemplary embodiments of FIG. 14, the tire 50 is mounted on the rim 647, 747, 847 between the two guide edges 51. The rim is produced as a lightweight construction with the lightweight material aluminum or an aluminum alloy. In the exemplary embodiment, AlSi7Mg0.3 which has a mass density of about 2.7 kg/dm$^3$ is used for this purpose. Therefore, in the exemplary embodiments of the vehicle wheel 646, 746, 846 for motor vehicles, rotors 600, 700, 800 according to FIG. 3 to 9 are used, with a light metal or light metal alloy with a mass density of less than 4.6 kg/dm$^3$ being used instead of the plastics material for the connection device 672, 772, 872 and the rim is designed as a connection device 672, 772 872 on which the guiding edges 51 are formed in one piece.

Figure 15:
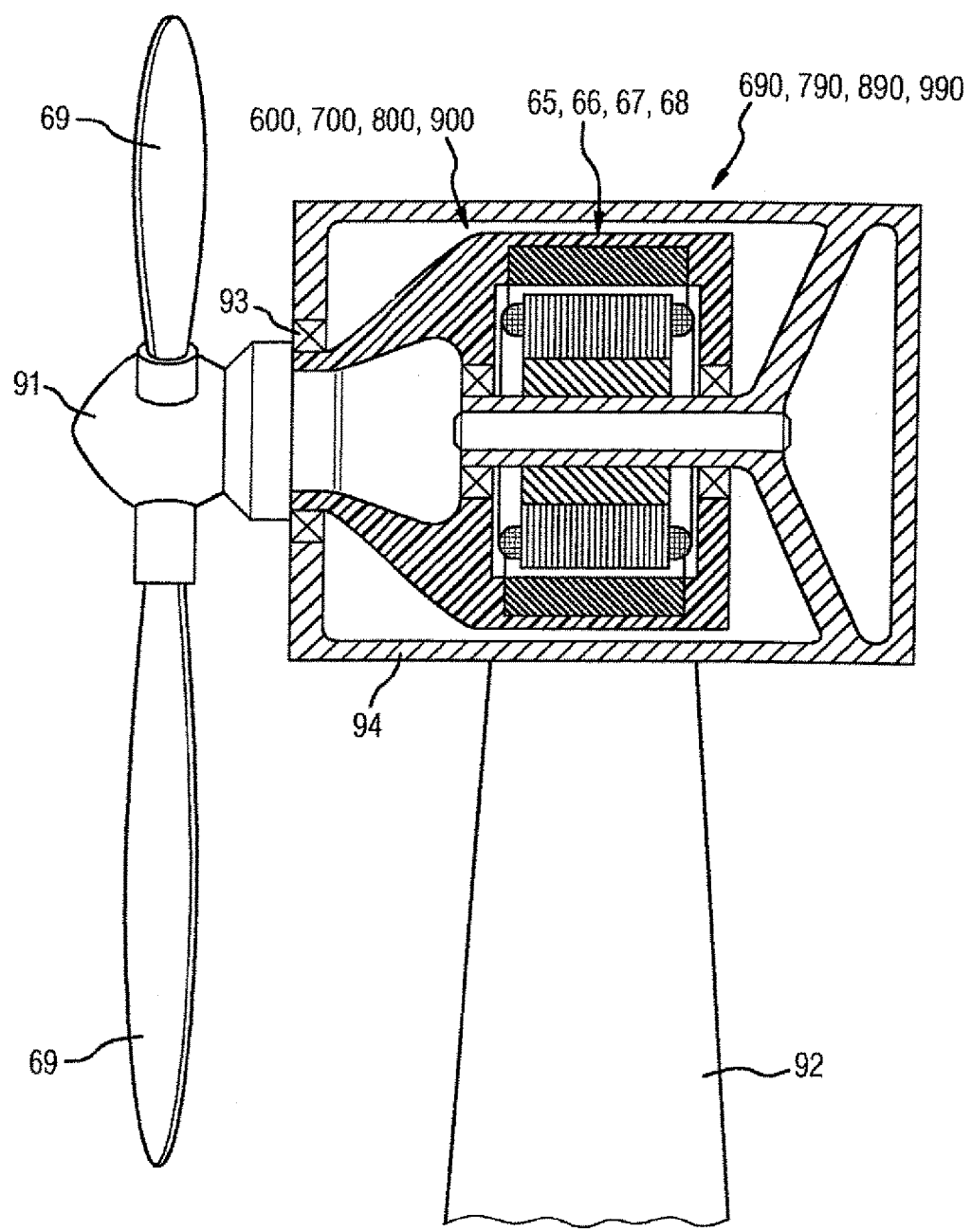
FIG. 15 shows exemplary embodiments of inventive wind turbines.

FIG. 15 shows exemplary embodiments of inventive wind turbines 690, 790, 890, 990. The wind turbine 690, 790, 890, 990 comprises a rotor 600, 700, 800, 900 and blades 69, which are connected with the rotor 600, 700, 800, 900. The wind turbine 690, 790, 890, 990 comprises an external rotor machine 65, 66, 67, 68, which is mounted at one end of a mast 92 of the wind turbine 690, 790, 890, 990, which mast is more than 10 m, often more than 100 m, high. The rotor 600, 700, 800, 900 is a lightweight construction, which in the exemplary embodiment of FIG. 15 comprises a hub 91, with which the blades are connected 69. In the exemplary embodiments wind turbine 690, 790, 890, 990, rotors 600, 700, 800, 900 according to FIG. 3 to FIG. 9 are used with a high-pole design, having at least 100 magnetic poles and a lightweight construction, with the fastening means 682, 782, 882, 982 being connected with the hub 91 by a further mounting device 93 on a supporting mechanism 94 so as to be rotatably mounted. The supporting mechanism 94 is fastened to the end of the mast 92. With the rotors 600, 700, 800, 900 in the exemplary embodiments of FIG. 15, a fiber composite is used instead of the plastics material for the connection device 672, 772, 872, 972. The fiber composite comprises a carbon fiber-reinforced plastics material. Therefore, at connection points between connection device 672, 772, 872, 972 and hub 91 and also hub 91 and blades 69, similar material properties exist in the connection device 672, 772, 872, 972, the hub 91 and the blades 69 due to the fiber composite. The connection device 672, 772, 872, 972 has a plurality of segments arranged about the axis of rotation 4. Therefore, the rotor 600, 700, 800, 900, in particular with a diameter of at least 1 m, can be composed of segments or individual segments can be replaced when the rotor is mounted on the wind turbine 690, 790, 890, 990.

Figure 16:
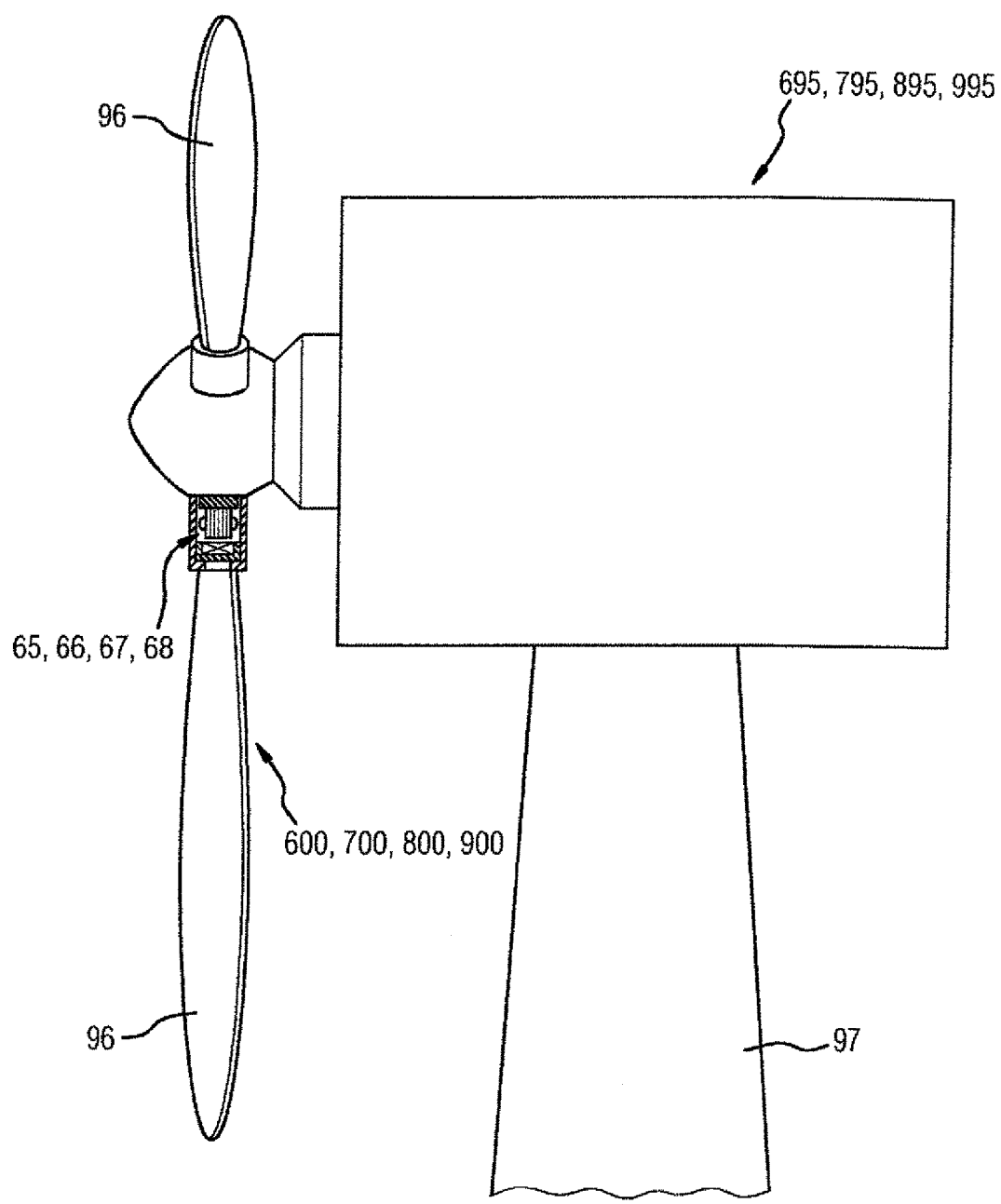
FIG. 16 shows exemplary embodiments of further inventive wind turbines.

FIG. 16 shows exemplary embodiments of further inventive wind turbines 695, 795, 895, 995. The wind turbine 695, 795, 895, 995 comprises the rotor 600, 700, 800, 900 and blades 96, which are connected with the rotor 600, 700, 800, 900. The wind turbine 695, 795, 895, 995 comprises an external rotor machine 65, 66, 67, 68, which is mounted at one end of a mast 97 of the wind turbine 695, 795, 895, 995, which mast is more than 10 m, often more than 100 m, high. The rotor 600, 700, 800, 900 is a lightweight construction which in the embodiment of FIG. 15 comprises the blades 96. The blades 96 are integrally connected to the rotor 600, 700, 800, 900. The integral connection is made by production of the blades 96 and the connection device 672, 772, 872, 972 as a unit predominantly made of fiber-reinforced composites.

Although the invention has been described in detail by the preferred embodiments, it is not limited to the disclosed examples. Other variations can be derived therefrom by a person skilled in the art without departing from the scope of the invention.

What is claimed is:

1. A rotor for an external rotor machine, said rotor comprising:
   a permanent magnet including a north pole and a south pole as magnetic poles and sized to extend from a first end to a second end in parallel relation to an axis of rotation, with the first end having an end face with a contour shaped as a recess or a web protruding with respect to the end face, said permanent magnet having a cross-section in which a magnetization runs from the south pole to the north pole and which has an envelope in the form of a sickle with a concave section arranged along a boundary of the rotor, and a convex section, with the permanent magnet running in an arcuate manner along the convex section, and with the magnetic poles running in an arcuate manner along the concave section, said contour of the end face at the first end having within the envelope a surface and a boundary shaped to extend in an arcuate manner from a first point of the convex section to a second point of the convex section; and a connection device for connecting with the permanent magnet via the surface of the end face at the first end by form fit.

2. The rotor of claim 1, wherein the concave section of the envelope is a circular arc defined by a radius, and the convex section of the envelope is a circular arc defined by a radius, said radius of the circular arc of the concave section being greater than the radius of the circular arc of the convex section.

3. The rotor of claim 1, wherein the permanent magnet has an axial contour running in a first direction in perpendicular relation to the cross-section shaped as a recess or a protruding web, said axial contour having a surface for connecting the connection device with the permanent magnet by form fit.

4. The rotor of claim 1, wherein the permanent magnet has a recess at the concave section between the north pole and the south pole.

5. The rotor of claim 1, wherein the permanent magnet runs along the concave section between the north pole and the south pole.

6. The rotor of claim 1, wherein the permanent magnet is a sintered permanent magnet.

7. The rotor of claim 1, wherein the connection device includes lightweight material having a mass density of less than 4.6 kg/dm$^3$ said permanent magnet and the lightweight material filling more than 90% of a mass volume between the boundary of the rotor and an envelope of the rotor.

8. The rotor of claim 1, wherein the connection device includes a plastics material.

9. The rotor of claim 1, further comprising a part made in one piece from a material and including a force-transmitting device, said part comprising more than 90% of a mass volume of the connection device.

10. The rotor of claim 1, wherein the connection device in a cross-section of the rotor extends annularly adjacent to the permanent magnet and concentrically to the boundary of the rotor.

11. The rotor of claim 1, wherein the permanent magnet directly faces an air gap between the rotor and a stator.

12. An external rotor machine, comprising:

a rotor comprising a permanent magnet including a north pole and a south pole as magnetic poles and sized to extend from a first end to a second end in parallel relation to an axis of rotation, with the first end having an end face with a contour shaped as a recess or a web protruding with respect to the end face, said permanent magnet having a cross-section in which a magnetization runs from the south pole to the north pole and which has an envelope in the form of a sickle with a concave section arranged along a boundary of the rotor, and a convex section, with the permanent magnet running in an arcuate manner along the convex section, and with the magnetic poles running in an arcuate manner along the concave section, said contour of the end face at the first end having within the envelope a surface and a boundary shaped to extend in an arcuate manner from a first point of the convex section to a second point of the convex section, and a connection device for connecting with the permanent magnet via the surface of the end face at the first end by form fit; and a stator magnetically interacting with the rotor across an air gap during operation of the external rotor machine, wherein the rotor is rotatably mounted about the axis of rotation.

13. A vehicle wheel, comprising a rim, said rim including a rotor comprising a permanent magnet including a north pole and a south pole as magnetic poles and sized to extend from a first end to a second end in parallel relation to an axis of rotation, with the first end having an end face with a contour shaped as a recess or a web protruding with respect to the end face, said permanent magnet having a cross-section in which a magnetization runs from the south pole to the north pole and which has an envelope in the form of a sickle with a concave section arranged along a boundary of the rotor, and a convex section, with the permanent magnet running in an arcuate manner along the convex section, and with the magnetic poles running in an arcuate manner along the concave section, said contour of the end face at the first end having within the envelope a surface and a boundary shaped to extend in an arcuate manner from a first point of the convex section to a second point of the convex section, and a connection device for connecting with the permanent magnet via the surface of the end face at the first end by form fit.

14. A wind turbine, comprising:

a rotor comprising a permanent magnet including a north pole and a south pole as magnetic poles and sized to extend from a first end to a second end in parallel relation to an axis of rotation, with the first end having an end face with a contour shaped as a recess or a web protruding with respect to the end face, said permanent magnet having a cross-section in which a magnetization runs from the south pole to the north pole and which has an envelope in the form of a sickle with a concave section arranged along a boundary of the rotor, and a convex section, with the permanent magnet running in an arcuate manner along the convex section, and with the magnetic poles running in an arcuate manner along the concave section, said contour of the end face at the first end having within the envelope a surface and a boundary shaped to extend in an arcuate manner from a first point of the convex section to a second point of the convex section, and a connection device for connecting with the permanent magnet via the surface of the end face at the first end by form fit; and blades connected with the rotor.

* * * * *